United States Patent
Lee et al.

(10) Patent No.: US 10,846,646 B1
(45) Date of Patent: Nov. 24, 2020

(54) COMPUTERIZED SYSTEMS AND METHODS FOR FACILITATING PACKAGE REDELIVERY

(71) Applicant: Coupang, Corp., Seoul (KR)

(72) Inventors: Yulhee Lee, Seoul (KR); Jiho Chang, Seoul (KR); Hyojeong Lee, Seoul (KR); Jeongho Pi, Hanam (KR); Sunggu Yu, Seongnam (KR); Dukwon Nam, Seoul (KR); Taenyun Kim, Seoul (KR); Hanjun Lee, Seoul (KR); Hyun Bo Kang, Seoul (KR); Soung Hie Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/550,865

(22) Filed: Aug. 26, 2019

(51) Int. Cl.
*G06Q 10/08* (2012.01)
*G06Q 30/06* (2012.01)

(52) U.S. Cl.
CPC ..... *G06Q 10/0832* (2013.01); *G06Q 10/0833* (2013.01); *G06Q 10/08355* (2013.01); *G06Q 30/0643* (2013.01)

(58) Field of Classification Search
CPC .................................................. G06Q 10/0832
See application file for complete search history.

(56) References Cited

U.S. PATENT DOCUMENTS

| | | | | |
|---|---|---|---|---|
| 6,021,942 A * | 2/2000 | Monico | ................ | B42D 15/006 235/375 |
| 7,257,552 B1 * | 8/2007 | Franco | .................. | G06Q 10/08 705/26.2 |
| 9,037,406 B2 * | 5/2015 | Mason | .................. | G01C 21/00 701/482 |
| 10,198,707 B1 * | 2/2019 | Bolton | ............... | G06Q 10/0837 |
| 2002/0072945 A1 * | 6/2002 | Yang | ................ | G06Q 10/06316 705/7.26 |
| 2009/0327136 A1 * | 12/2009 | Crussol | .................. | G06Q 10/08 705/50 |
| 2013/0097544 A1 * | 4/2013 | Parker | .................. | G09B 29/003 715/771 |

(Continued)

OTHER PUBLICATIONS

Song, Liying, Cherrett, Tom, and Guan, Wei, "Implications of collection/delivery points for transport and logistics," OR Insight, Operational Research Society Ltd., vol. 24, 4, pp. 231-255.*

*Primary Examiner* — Nathan Erb
(74) *Attorney, Agent, or Firm* — Finnegan, Henderson, Farabow, Garrett & Dunner LLP

(57) ABSTRACT

The present disclosure provides systems and methods for redelivering packages to customers, comprising a memory storing instructions and a processor configured to execute the instructions to receive, from a first user device, a notification of a delivery failure of a package, modify a database to assign the notification of the delivery failure and a cause for the delivery failure to the package identifier, modify the database to assign the package identifier to a group, among a plurality of groups, based on a delivery address associated with the package identifier, generate a map of the plurality of groups, and send the map for display on the user device. The map may comprise an activatable icon, and a location of the activatable icon on the map may be associated with the delivery address associated with the package identifier.

15 Claims, 13 Drawing Sheets

(56) References Cited

U.S. PATENT DOCUMENTS

| | | | |
|---|---|---|---|
| 2015/0106294 A1* | 4/2015 | Robinson | G06F 21/62 |
| | | | 705/339 |
| 2015/0356584 A1* | 12/2015 | Vaysman | G06Q 30/0207 |
| | | | 705/14.1 |
| 2016/0103560 A1* | 4/2016 | Yuschik | G09B 5/06 |
| | | | 715/707 |
| 2016/0292635 A1* | 10/2016 | Todasco | G06Q 10/0833 |
| 2016/0300186 A1* | 10/2016 | Scharaswak | G06Q 10/0835 |
| 2019/0197808 A1* | 6/2019 | Jinnai | B60R 25/01 |

* cited by examiner

COMPUTERIZED SYSTEMS AND METHODS FOR FACILITATING PACKAGE REDELIVERY

TECHNICAL FIELD

The present disclosure generally relates to computerized systems and methods for redelivering packages to customers. In particular, embodiments of the present disclosure relate to inventive and unconventional systems related to redelivering packages to customers by receiving a notification of a delivery failure of a package, assigning the package to a group based on a delivery address associated with the package, generating a map of a plurality of groups, and sending for display an activatable icon associated with the package on the map.

BACKGROUND

Various computerized systems and methods exist for redelivering packages to customers. For example, if a delivery worker is unable to deliver a package to a customer for various reasons, the delivery worker may leave a note with the customer, indicating that the package will be redelivered on another date, and the delivery worker may take the package back to a camp. However, when a delivery worker takes the package back from redelivery on another date, conventional systems do not effectively input the package back into the shipping and logistics system. Instead, the delivery worker merely takes the package back to the camp and repeatedly tries to redeliver the package to the customer. Accordingly, the package that is returned to the camp may be lost or the delivery worker may forget to redeliver the package to the customer. In addition, the delivery worker may forget the redelivery date and may be unable to redeliver the package on the redelivery date indicated to the customer. Consequently, delivery of packages to customers may be significantly delayed, which can lead to poor customer satisfaction. Therefore, there is a need for an improved computerized system and method that is capable of modifying a database to monitor delivery failures of packages and assign redelivery dates to packages that could not be delivered to the customer. As such, the chance of forgetting to redelivery packages or losing the packages at the camp may be minimized.

In addition, conventional systems may lead to inefficient visiting of delivery addresses by the delivery workers to redeliver packages. For example, a delivery worker may visit building A to redeliver a package and, then, visit building B to redeliver another package. However, the delivery worker may realize that another package needs to be redelivered to building A, and therefore, revisit building A. Alternatively, the delivery worker may realize that a package needs to be redelivered to building C that is closer to building A than to building B. As such, the delivery worker may need to travel more than necessary to redeliver packages at various locations. Accordingly, this may increase the time it takes for the delivery worker to redeliver each package to respective customers, and thus, decrease customer satisfaction.

Therefore, there is a need for improved systems and methods for redelivering packages to customers. In particular, there is a need for improved systems and methods for redelivering packages by assigning each package for redelivery into a group based on a delivery address associated with each package. In addition, there is a need for improved systems and methods for redelivering packages by providing delivery instructions associated with each package, providing route recommendations for delivering each package, and/or providing recommendations for placing each package in a vehicle for redelivery to customers.

SUMMARY

One aspect of the present disclosure is directed to a computer-implemented system for redelivering packages to customers. The system may comprise a memory storing instructions and at least one processor configured to execute the instructions. The at least one processor may be configured to execute the instructions to receive, from a first user device, a notification of a delivery failure of a package. The notification may comprise a package identifier associated with the package and a cause for the delivery failure. The at least one processor may be configured to execute the instructions to modify a database to assign the notification of the delivery failure and the cause for the delivery failure to the package identifier, modify the database to assign the package identifier to a group, among a plurality of groups, based on a delivery address associated with the package identifier, generate a map of the plurality of groups, and send the map for display on a second user device. Each of the plurality of groups may comprise one or more packages associated with a delivery address within a predetermined distance from each other. In addition, the map may comprise an activatable icon, and a location of the activatable icon on the map may be associated with the delivery address associated with the package identifier.

In some embodiments, the at least one processor may be further configured to execute the instructions to send instructions to the first user device to return the package to a camp for delivery. In some embodiments, the plurality of groups may be generated by determining a location of a camp storing packages for delivery to customers, identifying a first subset of packages for delivery to delivery addresses located within a first predetermined radius from the location of the camp, grouping the first subset of packages into a first group, with a second subset of packages remaining, identifying, from the second subset of packages remaining, a third subset of packages for delivery to delivery addresses located within a second predetermined radius from the location of the camp, the second predetermined radius being greater than the first predetermined radius, and grouping the third subset of packages into a second group.

In other embodiments, the plurality of groups may be generated by determining a location of a camp storing packages for delivery to customers, identifying a first subset of packages for delivery to delivery addresses located closest to the camp, the first subset comprising a predetermined number of packages, grouping the first subset of packages into a first group, with a second subset of packages remaining, identifying, from the second subset of packages remaining, a third subset of packages for delivery to delivery addresses located closest to the camp, the second subset comprising the predetermined number of packages, and grouping the third subset of packages into a second group.

In some embodiments, the activatable icon may include a number of indicative of a number of packages for delivery to the delivery address. In some embodiments, the activatable icon may be color-coded. The color of the activatable icon, for example, may be indicative of the group, to which the package identifier associated with the package is assigned.

In some embodiments, the at least one processor may be further configured to execute the instructions to send for display on the second user device delivery instructions associated with each package when the activatable icon is activated by a user of the second user device. In other embodiments, the at least one processor may be further configured to execute the instructions to send instruction to the first user device to capture an image of the package. In some embodiments, the notification of the delivery failure may further comprise the image of the package. In some embodiments, the at least one processor may be further configured to execute the instructions to determine a redelivery date associated with the package based on at least one of an expected delivery date of the package, the cause for the delivery failure, or a customer redelivery request, and modify the database to assign the redelivery date to the package identifier associated with the package. In some embodiments, the cause of the delivery failure may comprise at least one of a lack of time, an error associated with the delivery address, a misclassification, a shipping delay, an accident, a natural disaster, a customer request to postpone delivery, or a customer absence.

Another aspect of the present disclosure is directed to a computer-implemented method for redelivering packages to customers. The method may comprise receiving, from a first user device, a notification of a delivery failure of a package. The notification may comprise a package identifier associated with the package and a cause for the delivery failure. The method may also comprise modifying a database to assign the notification of the delivery failure and the cause for the delivery failure to the package identifier, modifying the database to assign the package identifier to a group, among a plurality of groups, based on a delivery address associated with the package identifier, generating a map of the plurality of groups, and sending the map for display on a second user device. Each of the plurality of groups may comprise one or more packages associated with a delivery address within a predetermined distance from each other. In addition, the map may comprise an activatable icon, and a location of the activatable icon on the map may be associated with the delivery address associated with the package identifier.

In some embodiments, the method may further comprise sending instructions to the first user device to return the package to a camp for delivery. In some embodiments, the plurality of groups may be generated by determining a location of a camp storing packages for delivery to customers, identifying a first subset of packages for delivery to delivery addresses located within a first predetermined radius from the location of the camp, grouping the first subset of packages into a first group, with a second subset of packages remaining, identifying, from the second subset of packages remaining, a third subset of packages for delivery to delivery addresses located within a second predetermined radius from the location of the camp, the second predetermined radius being greater than the first predetermined radius, and grouping the third subset of packages into a second group.

In other embodiments, the plurality of groups may be generated by determining a location of a camp storing packages for delivery to customers, identifying a first subset of packages for delivery to delivery addresses located closest to the camp, the first subset comprising a predetermined number of packages, grouping the first subset of packages into a first group, with a second subset of packages remaining, identifying, from the second subset of packages remaining, a third subset of packages for delivery to delivery addresses located closest to the camp, the second subset comprising the predetermined number of packages, and grouping the third subset of packages into a second group.

In some embodiments, the activatable icon may include a number of indicative of a number of packages for delivery to the delivery address. In some embodiments, the activatable icon may be color-coded. The color of the activatable icon, for example, may be indicative of the group, to which the package identifier associated with the package is assigned.

In some embodiments, the method may further comprise sending for display on the second user device delivery instructions associated with each package when the activatable icon is activated by a user of the second user device. In other embodiments, method may further comprise sending instructions to the first user device to capture an image of the package. In some embodiments, the notification of the delivery failure may further comprise the image of the package. In some embodiments, the method may further comprise determining a redelivery date associated with the package based on at least one of an expected delivery date of the package, the cause for the delivery failure, or a customer redelivery request, and modifying the database to assign the redelivery date to the package identifier associated with the package. In some embodiments, the cause of the delivery failure may comprise at least one of a lack of time, an error associated with the delivery address, a misclassification, a shipping delay, an accident, a natural disaster, a customer request to postpone delivery, or a customer absence.

Yet another aspect of the present disclosure is directed to a computer-implemented system for redelivering packages to customers. The system may comprise a memory storing instructions and at least one processor configured to execute the instructions. The at least one processor may be configured to execute the instructions to receive, from a first user device, a notification of a delivery failure of a package. The notification may comprise a package identifier associated with the package and a cause for the delivery failure. In addition, the cause of the delivery failure may comprise at least one of a lack of time, an error associated with the delivery address, a misclassification, a shipping delay, an accident, a natural disaster, a customer request to postpone delivery, or a customer absence. The at least one processor may be configured to execute the instructions to determine a redelivery date associated with the package based on at least one of an expected delivery date of the package, the cause for the delivery failure, or a customer redelivery request, modify a database to assign the notification of the delivery failure, the cause for the delivery failure, and the redelivery date to the package identifier, modify the database to assign the package identifier to a group, among a plurality of groups, based on a delivery address associated with the package identifier, generate a map of the plurality of groups, and send the map for display on a second user device. Each of the plurality of groups may comprise one or more packages associated with a delivery address within a predetermined distance from each other. In addition, the map may comprise an activatable icon, and a location of the activatable icon on the map may be associated with the delivery address associated with the package identifier. The plurality of groups may be generated by determining a location of a camp storing packages for delivery to customers, identifying a first subset of packages for delivery to delivery addresses located within a first predetermined radius from the location of the camp, grouping the first subset of packages into a first group, with a second subset of packages remaining, identifying, from the second subset of packages remaining, a third subset of packages for delivery to delivery addresses located within a second predetermined radius from the location of the camp, the second predetermined radius being greater than the first predetermined radius, and grouping the third subset of packages into a second group.

Other systems, methods, and computer-readable media are also discussed herein.

DETAILED DESCRIPTION

Figure 1A:
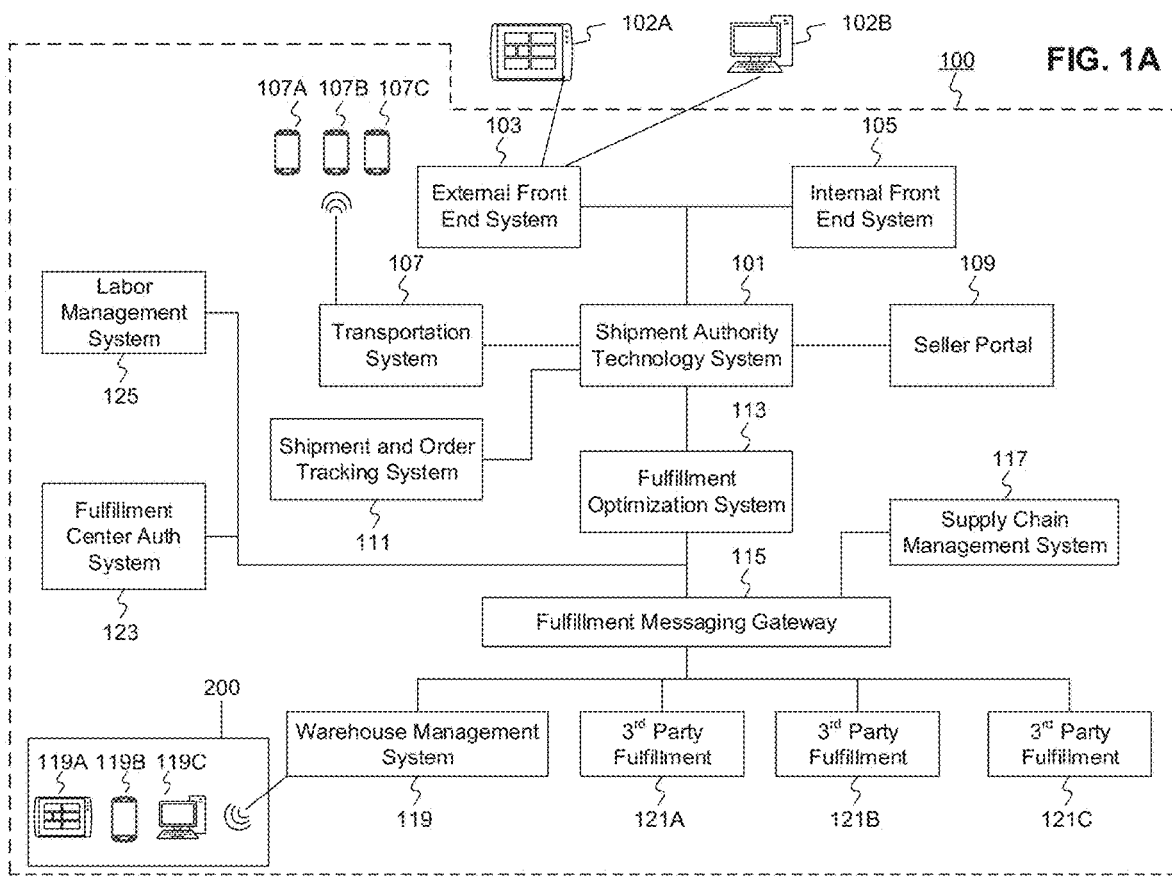
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for redelivering packages to customers. In particular, embodiments of the present disclosure are directed to systems and methods for redelivering packages to customers by receiving a notification of a delivery failure of a package, assigning the package to a group based on a delivery address associated with the package, generating a map of a plurality of groups, and sending for display an activatable icon associated with the package on the map.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
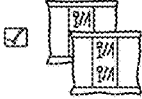
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
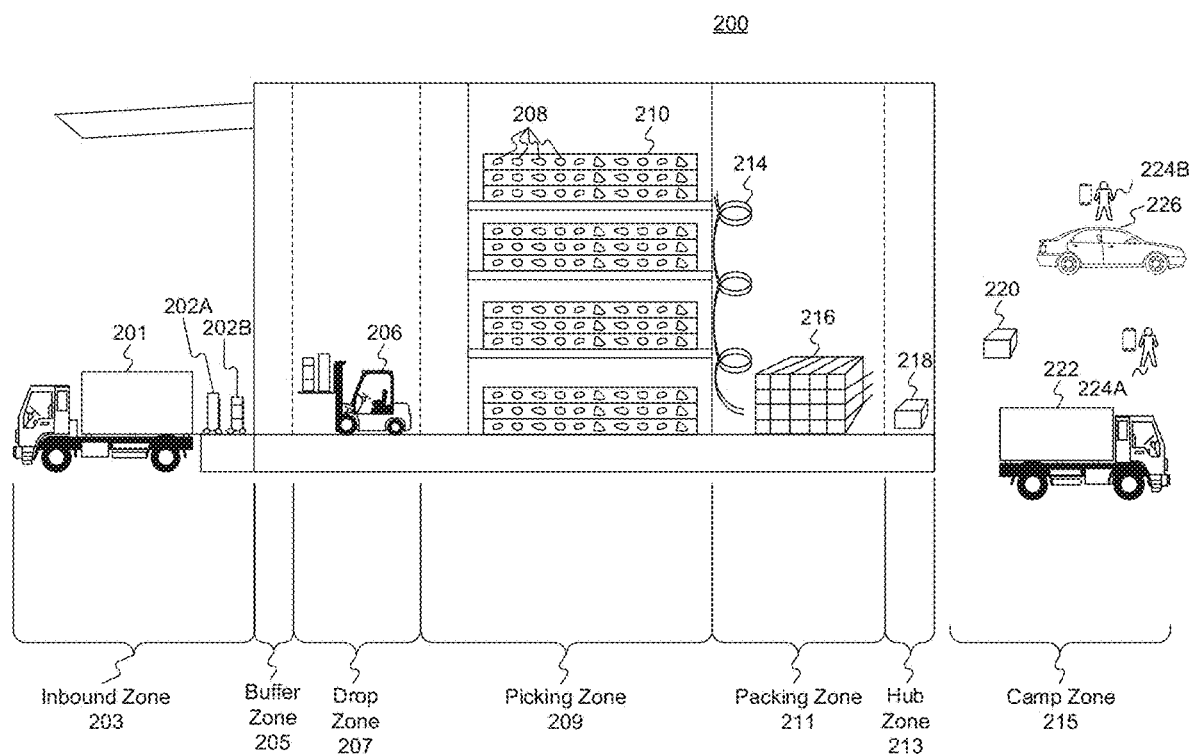
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
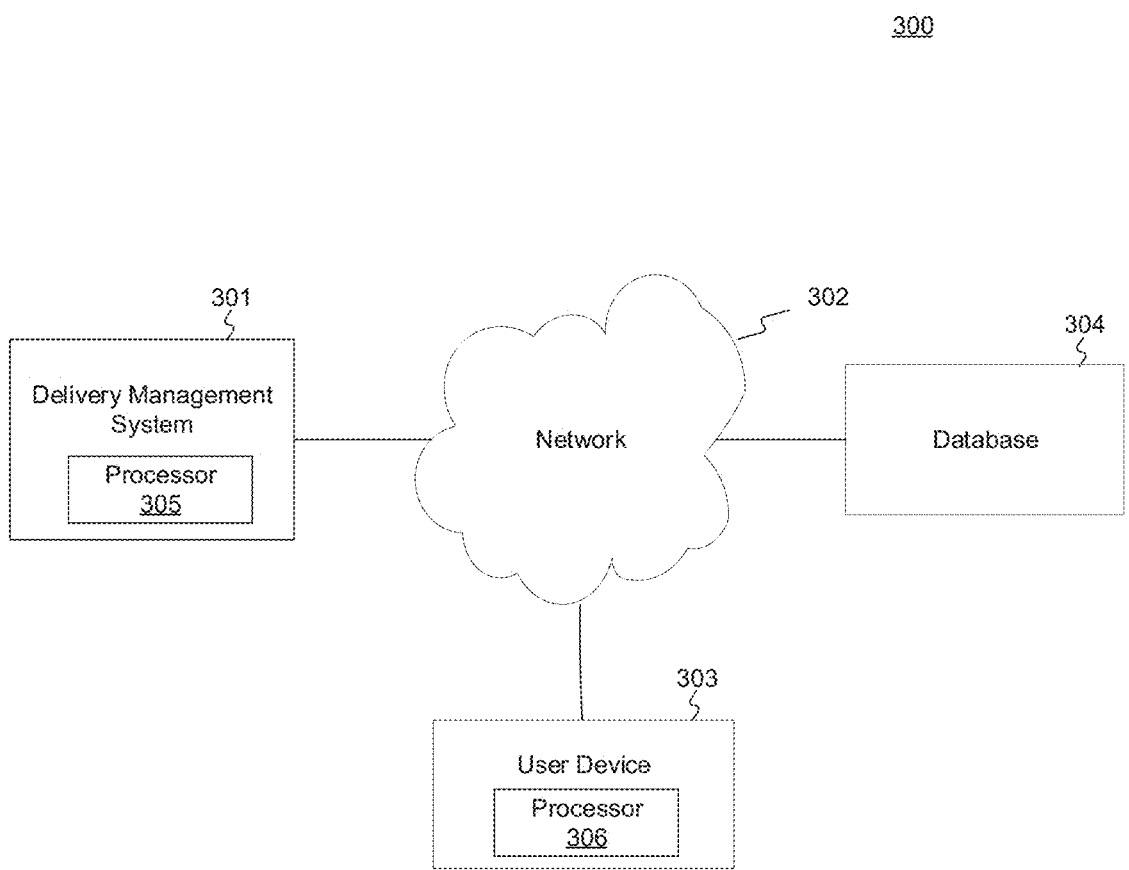
FIG. 3 is a schematic block diagram illustrating an exemplary embodiment of a system comprising a delivery management system for delivering packages to customers, consistent with the disclosed embodiments.

Referring to FIG. 3, a schematic block diagram 300 illustrating an exemplary embodiment of a system comprising a delivery management system 301 for facilitating package redelivery. Delivery management system 301 may be associated with one or more systems in system 100 of FIG. 1A. For example, delivery management system 301 may be implemented as part of the WMS 119. Additionally or alternatively, delivery management system 301 may be implemented as part of the FOS 113. Delivery management system 301, in some embodiments, may be implemented as a computer system that receives a notification of a delivery failure of a package and modify a database to assign the notification of the delivery failure to a package identifier associated with the package. For example, delivery management system 301 may comprise one or more processors 305 configured to modify a database, such as database 304, to assign the notification of the delivery failure, a cause for the delivery failure, and/or a redelivery date to the package identifier associated with the package such that database 304 may monitor in real-time the status of package deliveries to customers. By way of example, database 304 may store an inventory of every package for delivery to customers, a package identifier associated with each package (e.g., a shipping label), and a delivery address associated with each package. Database 304 may further store other information associated with each package, including but not limited to, customer-specific delivery instructions associated with each package, type of delivery (e.g., return, re-delivery, etc.), name of a worker delivering the package, timestamp of delivery, status of the delivery, reason for delivery failure, redelivery date, or the like. Database 304 may include one or more memory devices that store information and are accessed through network 302. By way of example, database 304 may include Oracle™ databases, Sybase™ databases, or other relational databases or non-relational databases, such as Hadoop sequence files, HBase, or Cassandra. While database 304 is illustrated as being included in the system 300, it may alternatively be located remotely from system 300. In other embodiments, database 304 may be incorporated into delivery management system 301 and/or user device 303. Database 304 may include computing components (e.g., database management system, database server, etc.) configured to receive and process requests for data stored in memory devices of database 304 and to provide data from database 304.

In some embodiments, one or more processors 305 may receive a package for redelivery, modify the database to assign the package identifier associated with the package to a group, among a plurality of groups, based on a corresponding delivery address, and generate a map of the plurality of groups to facilitate package redelivery. In some embodiments, each group may comprise one or more packages associated with a delivery address within a predetermined distance from each other. In some embodiments, one or more processors 305 may send the generated map, via network 302, for display on a second user device, such as user device 303. A user, such as a delivery worker, may use the user device 303 to begin the operation of redelivering packages to customers. While FIG. 3 illustrates one user device 303 in system 300, system 300 may comprise two or more user devices 303 in communication with delivery management system 301, database 304, and network 302. In some embodiments, system 300 may comprise at least one user device 303 associated with a fulfillment center, such as FC 200, and at least one user device 303 associated with a camp, such as camp zone 215. One or more processors 305, in some embodiments, may send the generated map, via network 302, for display on user device 303 associated with a camp. In some embodiments, one or more processors 305 may also send for display one or more activatable icons on one or more locations on the generated map. The location(s) of the activatable icon(s) may be indicative of or associated with the delivery address of each package.

System 300 may also comprise a network 302. Delivery management system 301, user device 303, and database 304 may be connected and be able to communicate with each other via network 302. Network 302 may be one or more of a wireless network, a wired network or any combination of wireless network and wired network. For example, network 302 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 302 may include, but not be limited to, telephone lines, fiber optics, IEEE Ethernet 802.3, a wide area network ("WAN"), a local area network ("LAN"), or a global network such as the Internet. Also network 302 may support an Internet network, a wireless communication network, a cellular network, or the like, or any combination thereof. Network 302 may further include one network, or any number of the exemplary types of networks mentioned above, operating as a stand-alone network or in cooperation with each other. Network 302 may utilize one or more protocols of one or more network elements to which they are communicatively coupled. Network 302 may translate to or from other protocols to one or more protocols of network devices. Although network 302 is depicted as a single network, it should be appreciated that according to one or more embodiments, network 302 may comprise a plurality of interconnected networks, such as, for example, the Internet, a service provider's network, a cable television network, corporate networks, or home networks.

System 300 may also comprise a server (not shown). The server may be a web server. The server, for example, may include hardware (e.g., one or more computers, including processors, storage, and input/output devices) and/or software (e.g., one or more applications) that deliver web content that can be accessed by, for example a user through a network (e.g., network 302), such as the Internet. The server may use, for example, a hypertext transfer protocol (HTTP, sHTTP, or HTTPS) to communicate with a user. The web pages delivered to the user may include, for example, HTML documents, which may include images, style sheets, and scripts in addition to text content.

A user program such as, for example, a web browser, web crawler, or native mobile application, may initiate communication by making a request for a specific resource using HTTP and the server may respond with the content of that resource or an error message if unable to do so. The server also may enable or facilitate receiving content from the user so the user may be able to, for example, submit web forms, including uploading of files. The server may also support server-side scripting using, for example, Active Server Pages (ASP), PHP, or other scripting languages. Accordingly, the behavior of the server can be scripted in separate files, while the actual server software remains unchanged.

In other embodiments, the server may be an application server, which may include hardware and/or software that is dedicated to the efficient execution of procedures (e.g., programs, routines, scripts) for supporting its applied applications. The server may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. The server may act as a set of components accessible through an API defined by the platform itself. For Web applications, these components may be performed in, for example, the same running environment as web servers, and application servers may support the construction of dynamic pages. Application servers also may implement services, such as, for example, clustering, fail-over, and load-balancing. In various embodiments, where application servers are Java application servers, the web servers may behave like an extended virtual machine for running applications, transparently handling connections to databases associated with a backend on one side, and, connections to the Web client on the other. In some embodiments, the server may be implemented within delivery management system 301.

System 300 may further comprise a user device 303. While FIG. 3 illustrates user device 303 as being remote from delivery management system 301, in some embodiments, user device 303 may be a user device within delivery management system 301. In addition, as discussed above, while FIG. 3 illustrates one user device 303, system 300 may comprise two or more user devices 303. For example, system 300 may comprise at least one user device 303 associated with a fulfillment center, such as FC 200, and at least one user device 303 associated with a camp, such as camp zone 215. User device 303 may be any computer device, or communications device including, but not limited to, a server, a network appliance, a personal computer (PC), a workstation, a mobile device, a phone, a handheld PC, a personal digital assistant (PDA), a thin client, a tablet computer, a smartphone, a fat client, an Internet browser, or other device. User device 303 may also be a tablet computer. Non-limiting examples of a tablet computer include an iPad, Kindle Fire, Playbook, Touchpad, and the like.

User device 303 may comprise one or more processors 306. In some embodiments, one or more processors 306 may be configured to communicate, via network 302, information with one or more processors 305 of delivery management system 301. In some embodiments, for example, one or more processors 306 may be configured to send a notification of a delivery failure of a package to one or more processors 305. For example, a user, such as a delivery worker, may input, using user device 303, a notification of a package delivery failure and input a cause for the delivery failure. The user may also input additional details regarding the delivery failure, as well as a redelivery date. One or more processors 306 may, then, send the notification to one or more processors 305. One or more processors 305 may modify the database, such as database 304, to assign the notification of the delivery failure to the package identifier, such that database 304 may update the status of each delivery. For example, each package may comprise a package identifier attached to it. Package identifiers be a unique address of a particular delivery address. For example, package identifiers may comprise a shipping label attached to the package that is indicative of a delivery address associated with the package. In other embodiments, package identifiers may be an item barcode, RFID tag, or a matrix barcode, such as a Quick Response (QR) code. User device 303 may comprise a camera or a scanner configured to scan package identifiers using an input device, such as an imaging device including a camera or a scanner. One or more processors 306 may send the scanned package identifier to one or more processors 305 of delivery management system 301, via network 302.

Figure 4:
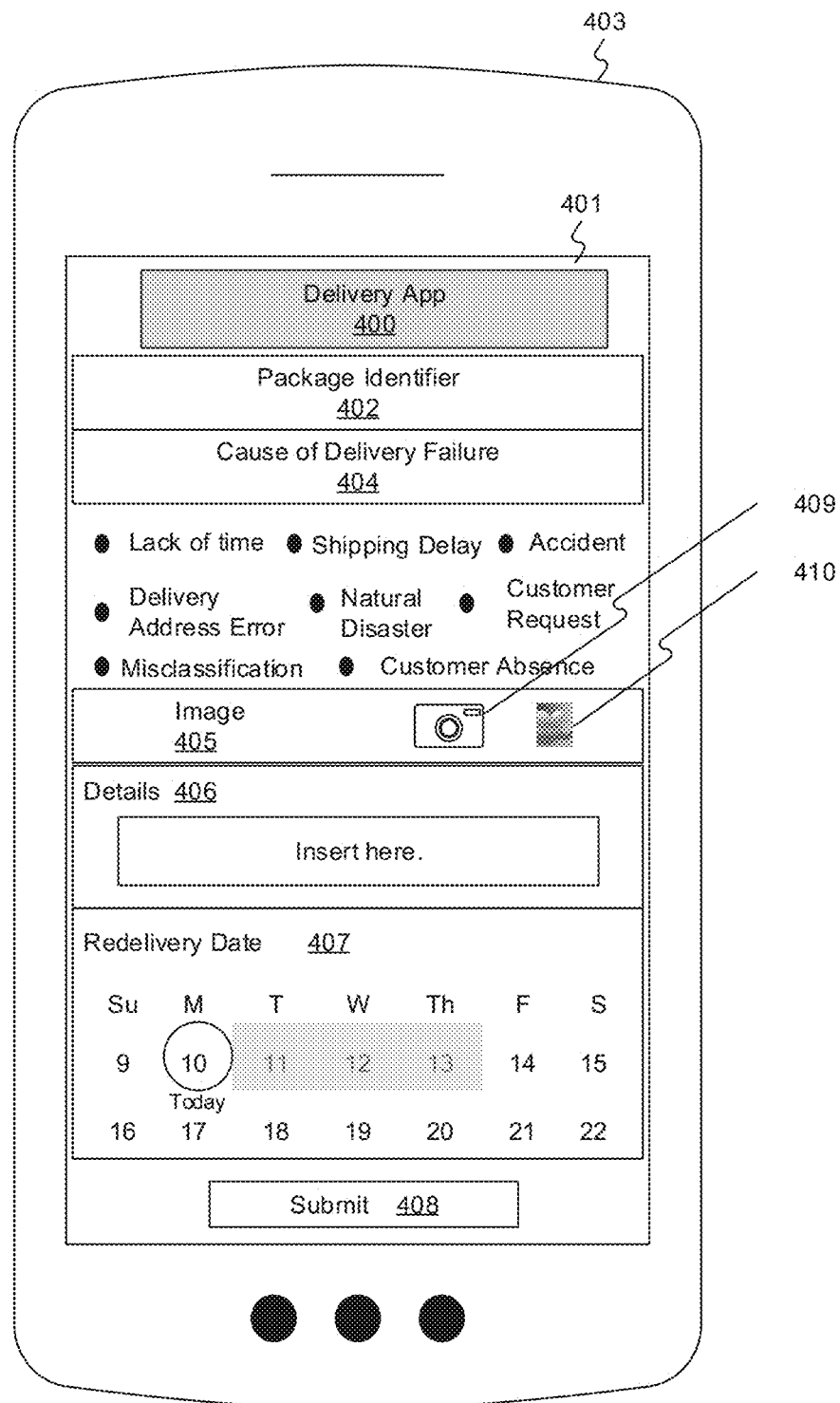
FIG. 4 is a diagrammatic illustration of an exemplary graphical user interface on a user device configured to send a notification of a package delivery failure, consistent with the disclosed embodiments.

FIG. 4 depicts an exemplary embodiment of a graphical user interface 401 that may be presented to the user on user device 403 via delivery app 400. User device 403 may be associated with a camp, such as camp zone 215. Additionally or alternatively, user device 403 may be associated with a fulfillment center, such as FC 200. In some embodiments, user device 403 may be implemented as user device 303 in FIG. 3. In particular, FIG. 4 shows an exemplary embodiment of an interface 401 on user device 403 configured to receive a notification of a delivery failure associated with a package. The package may be routed back to a camp, such as camp zone 215, before being redelivered to a customer.

Referring to FIG. 4, a user, such as a delivery worker, may use delivery app 400 to report a delivery failure of a package. In order to report the delivery failure, the user may first input a package identifier 402 associated with the package. As discussed above, for example, each package may comprise a package identifier 402 attached to it. Package identifiers may be a unique address of a particular delivery address. In some embodiments, a package identifier may comprise a shipping label attached to the package that is indicative of a delivery address associated with the package. In other embodiments, package identifiers may be an item barcode, RFID tag, or a matrix barcode, such as a Quick Response (QR) code.

User device 403 may comprise a camera or a scanner configured to scan package identifiers using an input device, such as an imaging device including a camera or a scanner. When the user scans the package identifier 402 associated with the package, one or more processors 306 may automatically populate the scanned package identifier 402 on interface 401.

Next, after scanning the package identifier 402 associated with the package, the user may identify a cause of the delivery failure 404. In some embodiments, one or more processors 306 may display one or more pre-populated causes of delivery failure 404 on interface 401, from which the user may make a selection. For example, database 304 may store one or more predetermined causes of delivery failure 404 that occur prevalently, and one or more processors 306 may pre-populate the one or more predetermined causes of delivery failure 404 on interface 401. The causes of delivery failure 404 may comprise, for example, a lack of time, a shipping delay, an accident, a delivery address error, a natural disaster, a customer request, a misclassification, a customer absence, or the like.

If the user ran out of time and could not deliver a package that was scheduled to be delivered to the customer today, the user may select "lack of time" as the cause of delivery failure 402. If there was a delay in the shipment of the package and the user did not receive the package in the camp for delivery, the user may select "shipping delay" as the cause of delivery failure 402. If the user was involved in an accident, such as a car accident, and could not deliver the package to the customer due to the accident, the user may select "accident" as the cause of delivery failure 404. If the user tried delivering a package to a delivery address associated with the package identifier, but the delivery address was incorrect, the user may select "delivery address error" as the cause of delivery failure 404. If there was a hurricane or an earthquake that prevented the user from being able to deliver a package to the customer, the user may select "natural disaster" as the cause of delivery failure 404. If the customer requested that the package be redelivered on another date, the user may select "customer request" as the cause of delivery failure 404. If the package was improperly assigned to a group that the user is responsible for and if the package should have been assigned to another group based on a delivery address associated with the package, the user may select "misclassification" as the cause of delivery failure 404. If the user tried delivering the package to the customer, but the customer was not available to receive the package, the user may select "customer absence" as the cause of delivery failure 404. If the cause of delivery failure 404 comprises either a delivery address error or a misclassification, one or more processors 305 may send instructions to a remote device (not shown) in a camp, such as camp zone 215, configured to store the package to return the package to another camp or to the fulfillment center, such as FC 200.

In some embodiments, the user of user device 403 may select one of the pre-populated causes of delivery failure 404 by pressing on, clicking on, scrolling over, and/or touching one of the causes of delivery failure 404 on interface 401. Additionally or alternatively, the user of user device 403 may input details 406 associated with the delivery failure. For example, if the user selects "natural disaster" as the cause of delivery failure 404, the user may input additional details 406 associated with the natural disaster. In other embodiments, if the user cannot select any of the pre-populated causes of delivery failure, the user may instead input another cause of delivery failure in the additional details section 406. The user may input details 406 using, for example, a keypad (not shown) displayed on interface 401, keypad associated with the user device 403, a stylus pen, or the like.

In other embodiments, one or more processors 306 of user device 403 may prompt the user to capture an image 405 of the package that could not be delivered to the customer such that another delivery worker or the customer may be able to easily identify the package. As discussed above, user device 403 may comprise a camera configured to capture an image 405 of the package using an input device, such as image sensor. One or more processors 306 may provide a plurality of options for the user to capture an image 405 of the package. For example, one or more processors 306 may display a camera icon 409 and a photo gallery icon 410 on interface 401. If the user selects the camera icon 409 by, for example, pressing on, clicking on, scrolling over, and/or touching the camera icon 409, one or more processors 306 may activate the camera of the user device 403 such that the user can capture an image of the package. Once the user captures an image of the package, one or more processors 306 may populate the image in the image section 405 on interface 401.

Additionally or alternatively, if the user selects the photo gallery icon 410 on interface 401, one or more processors 306 may access the photo gallery stored in a memory of the user device 403 and display one or more pictures stored in the photo gallery on interface 401. The user may be able to select one or more of the pictures stored in the photo gallery. Once one or more processors 306 receives the user's selection of one or more pictures stored in the photo gallery, one or more processors 306 may populate the one or more pictures in the image section 405 on interface 401.

In some embodiments, a user may input a redelivery date 407 on interface 401. For example, one or more processors 306 may display, on interface 401, a calendar such that the user may select a redelivery date 407 by pressing on, clicking on, scrolling over, and/or touching a particular date on the calendar. The user may select the redelivery date 407 based on, for example, an expected delivery date of the package, the cause of delivery failure 404, and/or a customer redelivery request. By way of example, if the cause of delivery failure 404 comprises a customer request, the customer may have specified a particular redelivery date in the request. As such, the user may select a redelivery date 407 that the customer specified in the request. Additionally or alternatively, even if the customer did not request a specific redelivery date, the user may select a redelivery date 407 that is within a predetermined number of days from the expected delivery date associated with the package. For example, the user may select a redelivery date 407 that is within 5 business days, 3 business days, or 1 business day from the expected delivery date associated with the package. In some embodiments, one or more processors 306 may highlight the predetermined number of days from the expected delivery date associated with the package. For example, as seen in FIG. 4, one or more processors 306 may highlight 3 business days from the expected delivery date associated with the package such that the user of user device 403 may easily visualize a timeframe in which the package should be redelivered to the customer.

After selecting the redelivery date 407, the user may submit the notification of delivery failure by pressing on, clicking on, scrolling over, and/or touching the submit button 408. After the user submits the notification of delivery failure, one or more processors 306 may send the notification to one or more processors 305 of delivery management system 301. After receiving the notification of delivery failure, one or more processors 305 may modify a database, such as database 304, to assign the notification of delivery failure to the package identifier 402. For example, one or more processors 305 may assign a "delivery failure" status to the package identifier 402 in database 304. One or more processors 305 may also modify database 304 to assign the cause of delivery failure 404, the redelivery date 407, the image 405, and/or any additional details 406 to the package identifier 402. As such, when a user looks up the package identifier 402 in database 304 to redeliver the package, the user may be able to determine the cause of the delivery failure 404, access an image 405 of the package to easily identify the package, determine any additional details 406 associated with the package delivery failure, and/or determine the redelivery date 407.

In some embodiments, instead of the user selecting the redelivery date 407, one or more processors 305 may determine the redelivery date based on for example, an expected delivery date of the package, the cause of delivery failure 404, and/or a customer redelivery request. For example, one or more processors 305 may identify the expected delivery date associated with the package identifier 402, the cause of delivery failure 404, and/or a customer redelivery request. For example, if the cause of delivery failure 404 is a delivery address error, one or more processors 305 may determine that it may take more time to fix the delivery address and redeliver the package to the customer than if the cause of delivery failure 404 is a lack of time. As such, one or more processors 305 may select a redelivery date 407 that is, for example, within 5 business days from the expected delivery date. In other embodiments, if many days have passed since the expected delivery date, regardless of the cause of delivery failure 404, one or more processors 305 may select a redelivery date 407 that is within 1 business day from the expected delivery date so as not to delay the delivery of the package any longer. Accordingly, one or more processors 305 may weigh at least one of the expected delivery date associated with the package identifier 402, the cause of delivery failure 404, and/or a customer redelivery request in order to determine a redelivery date 407. Once one or more processors 305 has determined the redelivery date 407, one or more processors 305 may modify database 304 to assign the redelivery date to package identifier 402. In addition, one or more processors 305 may send instructions to one or more processors 306 to display the redelivery date 407 on interface 401.

Figure 5A:
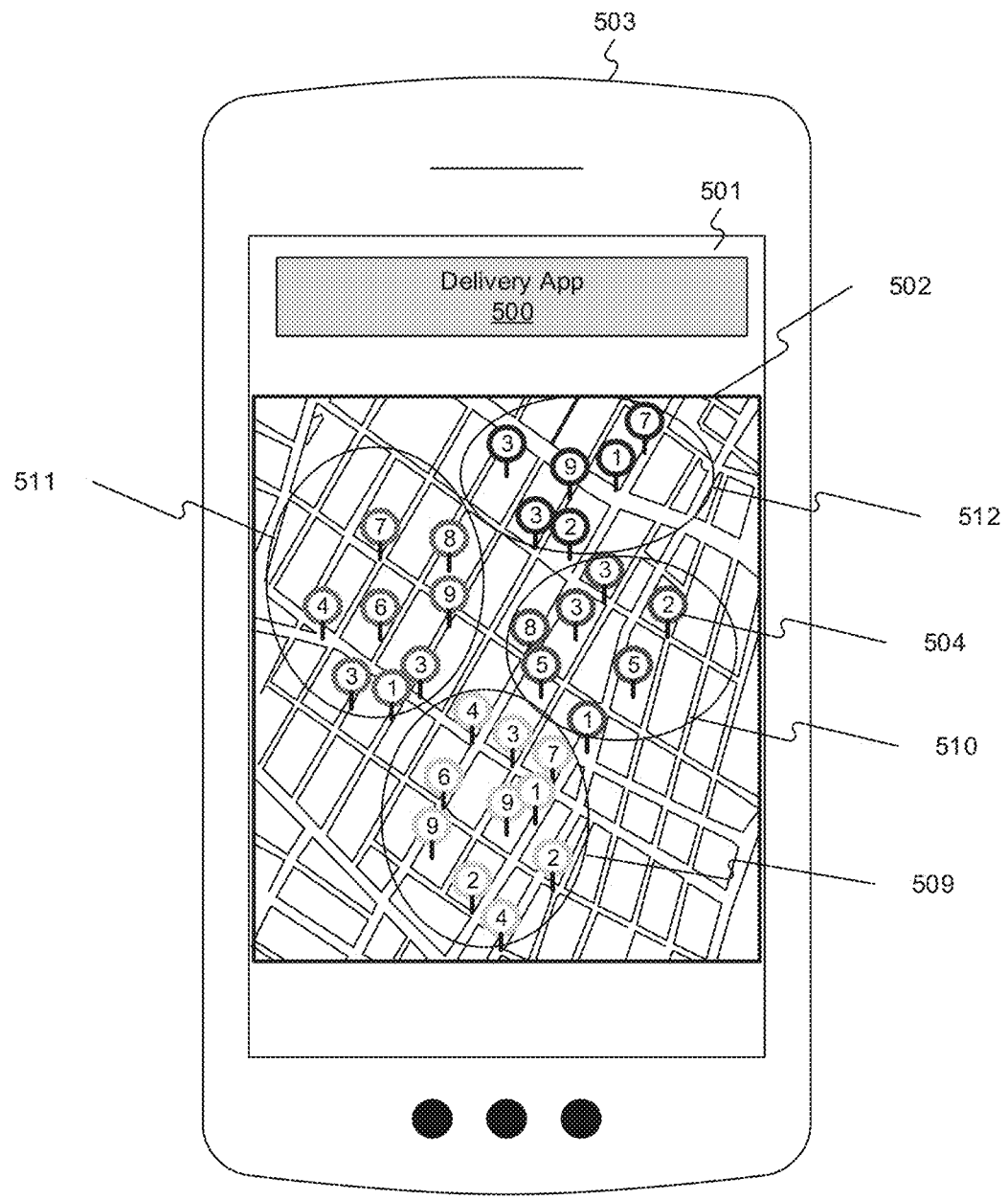
FIG. 5A is a diagrammatic illustration of an exemplary graphical user interface on a user device configured to facilitate package redelivery, consistent with the disclosed embodiments.
Figure 5B:
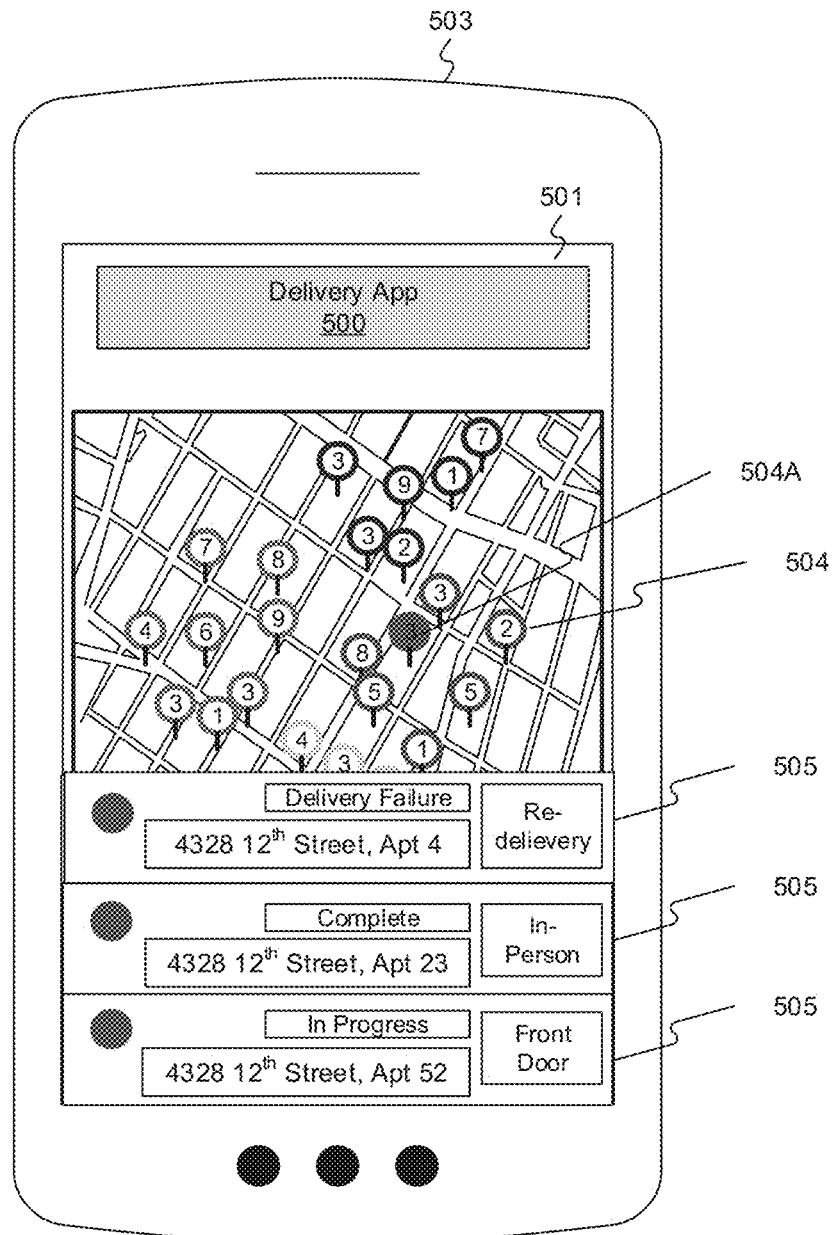
FIG. 5B is another diagrammatic illustration of the exemplary graphical user interface of FIG. 5A, consistent with the disclosed embodiments.
Figure 5C:
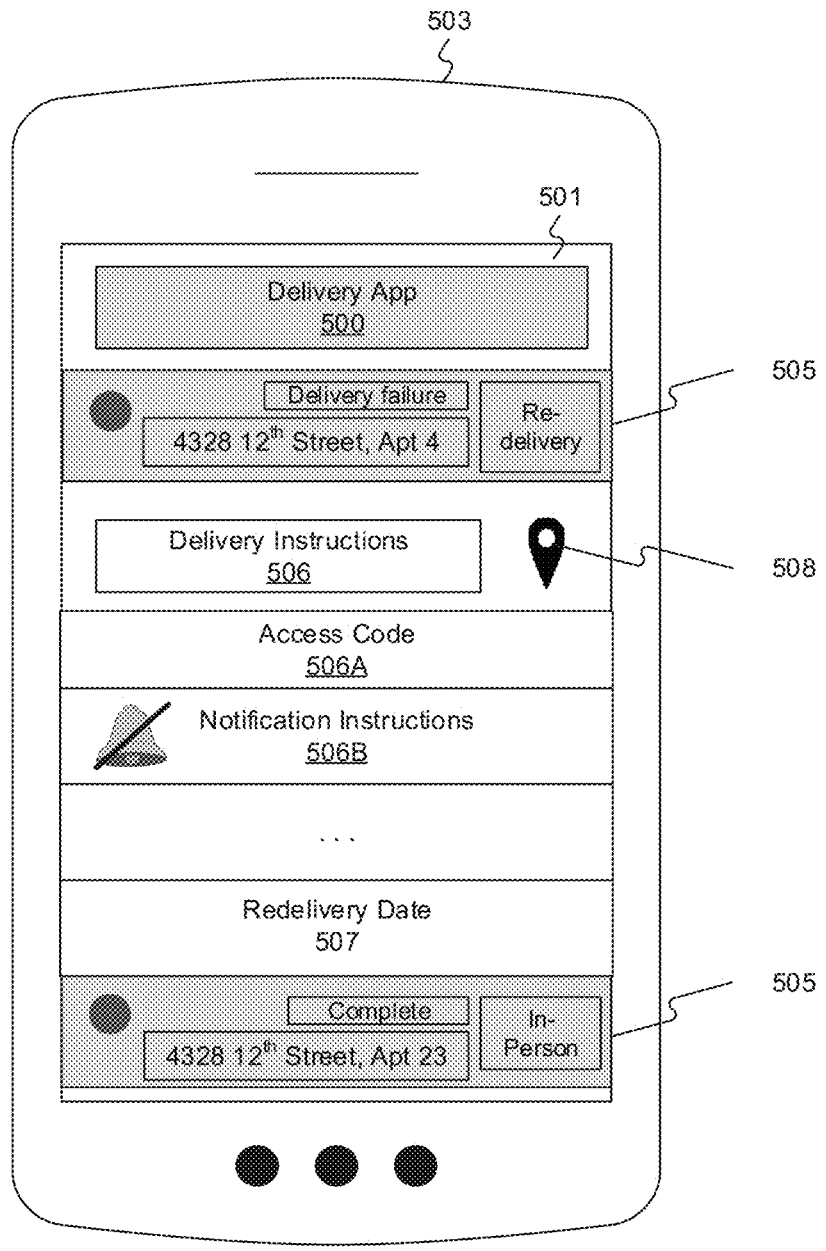
FIG. 5C is another diagrammatic illustration of the exemplary graphical user interface of FIG. 5A, consistent with the disclosed embodiments.

FIGS. 5A-5C depict exemplary embodiments of graphical user interface 501 that may be presented to the user on user device 503 via delivery app 500. User device 503 may be associated with a camp, such as camp zone 215. Additionally or alternatively, user device 503 may be associated with a fulfillment center, such as FC 200. In some embodiments, user device 503 may be implemented as user device 403 in FIG. 4. In other embodiments, user device 503 may be different from user device 403. For example, user device 503 may be operated by a user different from a user of user device 403.

In some embodiments, after receiving the notification of a delivery failure of a package, one or more processors 305 may modify a database, such as database 304, to assign the package identifier associated with the package, such as package identifier 402, to a group, among a plurality of groups, based on a delivery address associated with the package identifier 402. For example, one or more processors 305 of delivery management system 301 may determine, from the package identifier 402, a delivery address associated with the package identifier 402. In addition, one or more processors 305 may determine a location of the camp, at which the package associated with package identifier 402 is stored for redelivery. Each package may be temporarily stored in a camp while waiting to be redelivered to a customer. The camp, at which each package is stored, may be stored in database 304. Accordingly, one or more processors 305 may determine a delivery address associated with package identifier 402 and a location of the camp at which the package is stored.

In some embodiments, one or more processors 305 may modify database 304 to assign the package identifier 402 to a group. For example, database 304 may store a plurality of groups generated by one or more processors 305. Each of the plurality of groups may comprise one or more packages associated with a delivery address within a predetermined distance from each other. For example, each group may comprise one or more packages associated with a delivery address that is within 10 miles from each other. Additionally or alternatively, each camp may be assigned to one or more groups that are within a predetermined radius from the camp. For example, each camp may be assigned to one or more groups based on the location of the camp and the delivery addresses associated with each group. As such, a delivery worker in a particular camp may be responsible for delivering packages to one or more groups that are assigned to the particular camp.

In some embodiments, one or more processors 305 may modify database 304 to assign the package identifier 402 to a group, among the plurality of groups generated, based on the delivery address associated with package identifier 402 and/or a location of the camp at which the package is stored. For example, one or more processors 305 may identify one or more groups assigned to the camp. Then, one or more processors 305 may compare the delivery address associated with package identifier 402 with the delivery addresses associated with the one or more groups. Then, one or more processors 305 may identify a group, among the plurality of groups, to which the delivery address associated with package identifier 402 matches and modify database 304 to assign the package identifier 402 to the identified group.

When a delivery worker in a camp, such as camp zone 215, opens delivery app 500 on user device 503 to begin the operation of redelivering packages to customers, one or more processors 306 of user device 503 may send a request for a map of pending package deliveries from one or more processors 305. In response, one or more processors 305 may access database 304 to retrieve a list of pending package deliveries associated with the camp and generate a map of the pending deliveries. One or more processors 305 may, then, send the map for display on user device 503. FIG. 5A illustrates an exemplary embodiment of a map 502 generated and displayed on interface 501 of delivery app 500.

As seen in FIG. 5A, a map 502 may be generated and displayed on interface 501. Map 502 may comprise a plurality of activatable icons 504 overlaid or superimposed on top of the map 502. Each activatable icon 504 may be indicative of one or more packages for delivery to customers, including one or more packages for redelivery to customers. In addition, each activatable icon 504 may be placed on a respective location on the map 502. In some embodiments, the location of the activatable icon 504 on map 502 may be associated with a delivery address associated with the one or more packages. That is, one or more processors 305 may place each activatable icon 504 on a particular location on map 502 that represents the location of the delivery address associated with one or more packages represented by the activatable icon 504.

As seen in FIG. 5A, activatable icon 504 may include a number. The number may be indicative of a number of packages for delivery to the delivery address. Additionally or alternatively, the number may be indicative of a number of deliveries to the delivery address, and each delivery may be associated with one or more packages. In other embodiments, activatable icon 504 may be color-coded. For example, the color of the activatable icon may be indicative of the group, to which the activatable icon 504 belongs. That is, the color of the activatable icon may be indicative of the group, to which one or more packages represented by the activatable icon 504 are assigned. By way of example, group 1 (represented by circle 509) may be indicated by a yellow activatable icon 504, group 2 (represented by circle 510) may be indicated by a red activatable icon 504, group 3 (represented by circle 511) may be indicated by a green activatable icon 504, and group 4 (represented by circle 512) may be indicated by a blue activatable icon 504. While activatable icon 504 may be color-coded, one of ordinary skill in the art could envision other alternatives to indicate the group, to which the activatable icon 504 belongs. For example, various numbers, symbols, images, textures, patterns, or the like may be used to differentiate the activatable icons 504 based on the group to which each activatable icon 504 belongs.

In some embodiments, activatable icon 504 may be activated by a user of the user device 503. For example, the user may press, click on, scroll over, or touch each activatable icon 504 to activate it. When the user activates activatable icon 504, one or more processors 305 may send instructions to one or more processors 306 to display, on interface 501, details associated with the activated activatable icon 504. For example, as seen in FIG. 5B, when the user may have activated activatable icon 504A, among the plurality of activatable icons 504. If the user activates an activatable icon 504A, the activatable icon 504A, for example, may be highlighted. The activatable icon 504A, for example, includes a number 3. This may indicate that there are three packages for delivery to the location of the activatable icon 504A.

In some embodiments, when the user activates activatable icon 504A, one or more processors 305 may send for display on interface 501 details 505 associated with the activatable icon 504A. For example, as seen in FIG. 5B, one or more processors 305 may send instructions to one or more processors 306 to display a delivery address associated with each package represented by the activatable icon 504A, a status of delivery for each package, and a type of delivery associated with each package. For example, the status of delivery for each package may include, but is not limited to, an "in-progress" status, a "delivery failure" status, a "complete" status, and "ready" status. An "in-progress" status may indicate that the package has been loaded onto a vehicle and a delivery worker is on his or her way to deliver the package to the customer. A "delivery failure" status may indicate that an attempt to deliver the package has been made, but the package could not be delivered to the customer. A "complete" status may indicate that the package has been delivered to the customer. A "ready" status may indicate that the package is ready for delivery, but the package has not been loaded onto a vehicle for delivery yet. The type of delivery associated with each package may comprise, for example, a way, in which the customer would like to receive the package. For example, the customer may want to receive the package in-person in order to verify that the customer has received the package, especially if the package contains expensive products. Alternatively, the customer may want to have a delivery worker leave the package at the front door. Alternatively, the customer may want to have a delivery worker leave the package at the front desk or the concierge. In addition, the type of delivery may indicate, for example, whether the delivery is a first-time delivery or a redelivery. For example, if the package needs to be redelivered to the customer because there was a delivery failure previously, one or more processors 306 may indicate display "redelivery" in details 505. As such, one or more processors 305 may send instructions to one or more processors 306 to display the type of delivery when a user, such as a delivery worker, activates an activatable icon, such as activatable icon 504A.

In some embodiments, the user may activate each detail 505 in order to retrieve additional details associated with each package delivery. For example, the user may press, click on, scroll over, or touch each detail 505 to activate it. When the user activates a detail 505, one or more processors 305 may send instructions to one or more processors 306 to display, on interface 501, additional details associated with each package delivery. For example, as seen in FIG. 5C, one or more processors 305 may send for display additional details, including but not limited to, delivery instructions 506, such as access code 506A associated with the delivery address and notification instructions 506B, redelivery date 507, and a map icon 508.

In some embodiments, delivery instructions 506 may comprise, among other things, an access code 506A associated with the delivery address associated with each package and notification instructions 506B. For example, if a package needs to be delivered in-person or to the front door of an apartment unit, a user, such as a delivery worker, may need to enter the apartment building. Many apartments are securely gated and the user, such as a delivery worker, may need to enter an access code in order to enter the apartment building. As such, the customer may input delivery instructions 506, such as access code 506A, and one or more processors 305 may send for display the access code 506A on interface 401. In other embodiments, a customer may have a pet inside their home and may not want the user to ring the doorbell when delivering a package to the customer. As such, the customer may input notification instructions 506B, such as a "Do Not Ring the Doorbell" instruction or "Do Not Knock" instruction, and one or more processors 305 may send for display the notification instructions 506B on interface 501. A person of ordinary skill in the art could envision other delivery instructions 506 that could be sent for display by one or more processors 305 on interface 501. For example, one or more processors 305 may send for display additional details, including but not limited to, contact information of the customer, an emergency contact information, the date and timeframe, at which the customer would like to receive the delivery, a cause of delivery failure, 404, any additional details 406, an image 405 of the package, or the like.

In some embodiments, one or more processors 305 may further send for display, on interface 501, a redelivery date 507 of the package. As discussed above, the redelivery date 507 may be a date selected by the user, such as a delivery worker, or a date determined by the one or more processors 305, based on at least one of an expected delivery date of the package, the cause for the delivery failure 404, or a customer redelivery request. The redelivery date 507 may be displayed such that a user, such as a delivery worker, may prioritize package deliveries based on the redelivery date 507 associated with each package. Additionally or alternatively, when the user delivers the package to the customer, one or more processors 305 may also display, on interface 501, a timestamp, at which the user has delivered the package to the customer.

In other embodiments, one or more processors 305 may also send for display, on interface 501, a map icon 508. The map icon 508 may be activatable. For example, the user, such as a delivery worker, may activate the map icon 508 by pressing, clicking on, scrolling over, or touching the map icon 508. When the user activates the map icon 508, one or more processors 305 may send for display, on interface 501, one or more route recommendations for delivering each package. For example, one or more processors 305 may retrieve real-time traffic conditions from database 304 and generate one or more route recommendations for delivering the package to the delivery address from a camp, such as camp zone 215. The route recommendations may comprise recommendation of a fastest route, a shortest route in distance, or the like. In other embodiments, one or more processors 305 may retrieve information from database 304, such as delivery status associated with other pending package deliveries, and provide a route recommendation that allows the user to deliver packages in each group in a shortest period of time possible.

Figure 6:
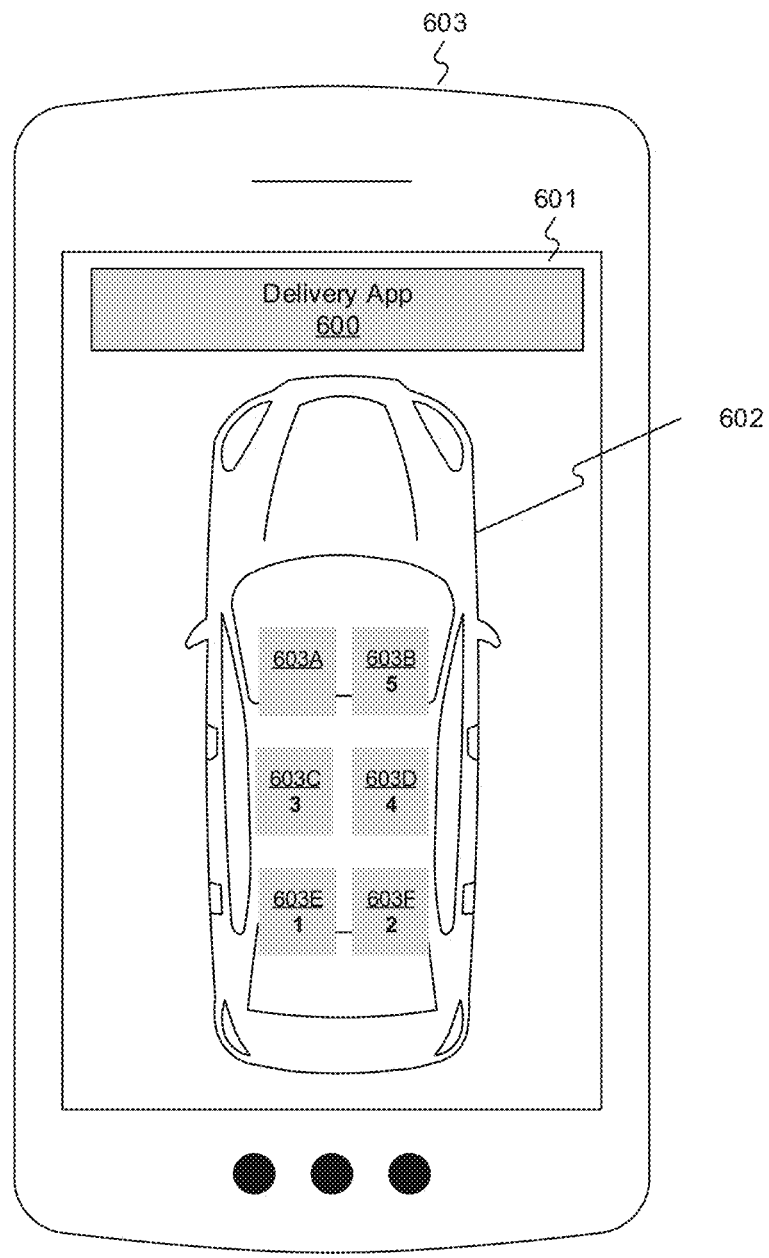
FIG. 6 is a diagrammatic illustration of another exemplary graphical user interface on a user device configured to provide a recommendation for placing one or more packages in a vehicle, consistent with the disclosed embodiments.

FIG. 6 depicts another exemplary embodiment of graphical user interface 601 that may be presented to the user on user device 603 via delivery app 600. User device 603 may be implemented as user device 503 in FIG. 5 or user device 403 in FIG. 4. In addition, delivery app 600 and interface 601 may be implemented as delivery app 500, 400 and interface 501, 401, respectively. User device 603 may be associated with a camp, such as camp zone 215. Additionally or alternatively, user device 603 may be associated with a fulfillment center, such as FC 200. In some embodiments, user device 603 may be different from user device 403. For example, user device 603 may be operated by a user different from a user of user device 403. In particular, FIG. 6 shows an exemplary embodiment of an interface 601 on user device 603 configured to display recommendations for placing groups of one or more packages in a vehicle for delivery to the customers.

In some embodiments, one or more processors 305 may send instructions to one or more processors 306 to display an image of a vehicle 602 on interface 601. The vehicle 602 may be compartmentalized into one or more sections 603A-F. By way of example, the vehicle 602 may be compartmentalized into sections 603A-F based on the number of seats in the vehicle 602. For example, if the vehicle 602 is a 5-person vehicle, then, the vehicle 602 may be compartmentalized into five sections 603A-F. Each section 603A-F may represent a place to store one or more packages. For example, as seen in FIG. 6, section 603B may represent a place to store one or more packages assigned to group 5, section 603C may represent a place to store one or more packages assigned to group 3, section 603D may represent a place to store one or more packages assigned to group 4, section 603E may represent a place to store one or more packages assigned to group 1, and 603F may represent a place to store one or more packages assigned to group 2. Accordingly, one or more processors 305 may assign different groups of packages to sections 603A-F, based on, for example, a location of the camp storing the packages for delivery to customers and delivery addresses associated with one or more packages in each group. In some embodiments, one or more processors 305 may assign different groups of packages to sections 603A-F, based on, for example, a route recommendation (e.g., 508 in FIG. 5C) provided by one or more processors 305.

In some embodiments, one or more processors 305 may provide a recommendation to place one or more packages assigned to groups 1 and 2 in sections 603E and 603F of vehicle 602, respectively, based on a distance from the camp to delivery addresses associated with groups 1 and 2. For example, delivery addresses associated with packages in groups 1 and 2 may be closest in distance to the camp. As such, one or more processors 305 may recommend that the user, such as a delivery worker, deliver packages in groups 1 and 2 first, and thus, recommend the user to place these packages in sections 603E and 603F. As such, packages in groups 1 and 2 may be more accessible, and the user may not need to move around the packages in the vehicle 602 in order to reach packages that are assigned to groups 1 and 2. Other categories may be used to provide recommendations to place packages in a vehicle. For example, one or more processors 305 may take various factors into consideration, including but not limited to, fragility of the packages, temperatures at which each package must be maintained, or the like.

Figure 7:
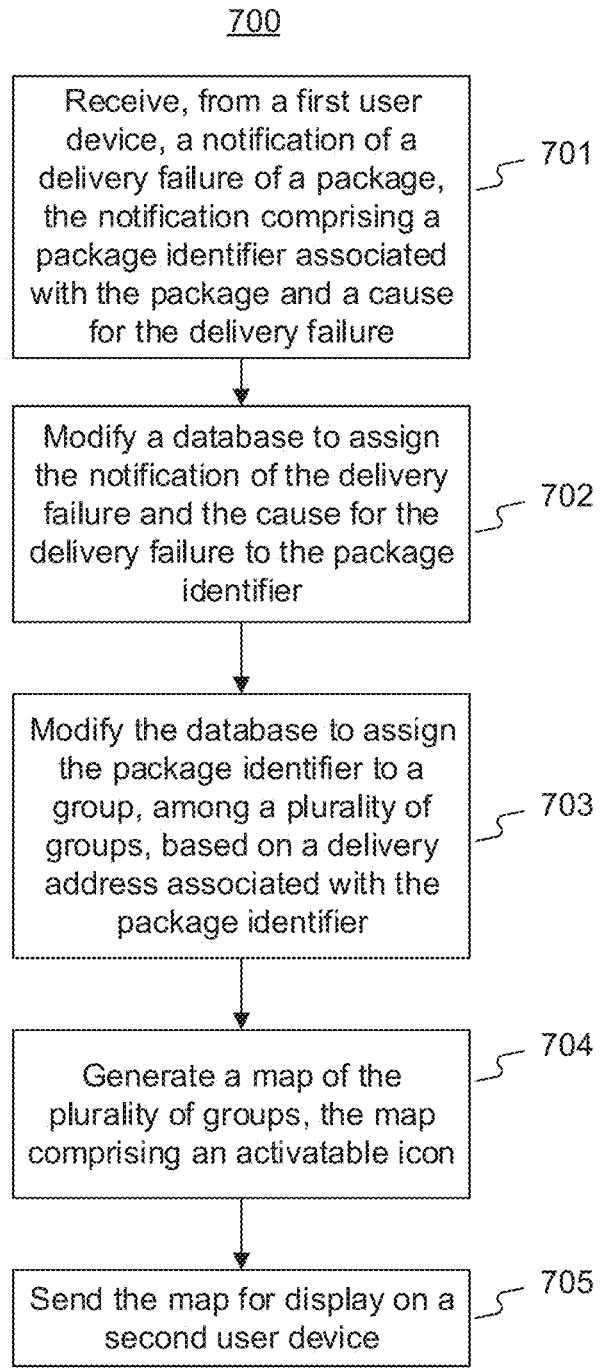
FIG. 7 is a flowchart illustrating an exemplary embodiment of a method for redelivering packages to customers, consistent with the disclosed embodiments.

FIG. 7 is a flow chart illustrating an exemplary method 700 for delivering packages to customers. This exemplary method is provided by way of example. Method 700 shown in FIG. 7 can be executed or otherwise performed by one or more combinations of various systems. Method 700 as described below may be carried out by delivery management system 301 and/or user device 303, as shown in FIG. 3, by way of example. While various elements of delivery management system 301 are referenced in explaining the method of FIG. 7, it should be noted that various elements of user device 303 may carry out the method of FIG. 7. Each block shown in FIG. 7 represents one or more processes, methods, or subroutines in the exemplary method 600. Referring to FIG. 7, exemplary method 700 may begin at block 701.

At block 701, one or more processors 305 may receive, from a user device, a notification of a delivery failure of a package. For example, as discussed above, the user may use a delivery app, such as delivery app 400, to report a delivery failure. In order to report the delivery failure, the user may scan a package identifier, such as package identifier 402, associated with the package, select a cause of delivery failure 404 on interface 401, capture an image 405 of the package, input any additional details 406 associated with the delivery failure, and/or select a redelivery date 407. One or more processors 306 may send the notification of delivery failure to one or more processors 305. In some embodiments, the notification of delivery failure may comprise a package identifier, such as package identifier 402, associated with the package and a cause for the delivery failure 404. In some embodiments, the notification may also comprise a redelivery date 407 associated with the package.

After receiving the notification of delivery failure, method 700 may proceed to block 702. At block 702, one or more processors 305 may modify a database, such as database 304, to assign the notification of the delivery failure and/or the cause of delivery failure to the package identifier 402. For example, one or more processors 305 may modify database 304 to update a delivery status associated with the package identifier to a "delivery failure" status. Additionally or alternatively, one or more processors 305 may modify database 304 to assign the cause of delivery failure to the package identifier 402, such that when a user scans or looks up the package identifier 402, the user may determine the cause of delivery failure associated with the package. Additionally or alternatively, one or more processors 305 may modify database 304 to assign a redelivery date 407 to the package identifier 402. As such, when a user scans or looks up the package identifier 402, the user may determine a redelivery date, by which the user must deliver the package to the customer. Accordingly, database 304 may maintain a real-time status of each delivery in order to ensure that packages are timely delivered or redelivered to customers.

Method 700 may further proceed to block 703. At block 703, one or more processors 305 of delivery management system 301 may modify a database, such as database 304, to assign the package identifier 402 to a group, based on a delivery address associated with the package identifier 402. For example, one or more processors 305 of delivery management system 301 may determine, from database 304, a delivery address associated with the package identifier 402.

In addition, one or more processors 305 may determine a location of the camp, at which the package is stored before redelivery to the customer. The camp, at which the package is stored, may be stored in database 304. Accordingly, one or more processors 305 may determine a delivery address associated with package identifier 402 and a location of the camp at which the package is stored. Then, one or more processors 305 may modify database 304 to assign the package identifier 402 to a group. As discussed above, each of the plurality of groups may comprise one or more packages associated with a delivery address within a predetermined distance from each other. For example, each group may comprise one or more packages associated with a delivery address that is within 10 miles from each other. Additionally or alternatively, each camp may be assigned to one or more groups that are within a predetermined radius from the camp. For example, each camp may be assigned to one or more groups based on the location of the camp and the delivery addresses associated with each group. As such, a delivery worker in a particular camp may be responsible for delivering packages to one or more groups that are assigned to the particular camp.

In some embodiments, one or more processors 305 may assign the package identifier to a group, among the plurality of groups generated, based on the delivery address associated with package identifier 402 and the location of the camp at which the package is stored. For example, one or more processors 305 may identify one or more groups assigned to the camp, to which the package is routed. Then, one or more processors 305 may compare the delivery address associated with package identifier 402 with the delivery addresses associated with the one or more groups. Then, one or more processors 305 may identify a group, among the plurality of groups, to which the delivery address associated with package identifier 402 matches and modify database 304 to assign the package identifier 402 to the identified group.

As discussed above, a plurality of groups may be generated by one or more processors 305 and stored in database 304. In some embodiments, one or more processors 305 may generate the plurality of groups by determining a location of a camp storing packages for delivery to customers, identifying a first subset of packages for delivery to delivery addresses located within a first predetermined radius from the location of the camp, and grouping the first subset of packages into a first group. The first predetermined radius may be, for example, in a range of 5 miles to 20 miles from the location of the camp. After grouping the first subset of packages into a first group, a second subset of packages may be remaining. One or more processors 305 may further identify, from the second subset of packages remaining, a third subset of packages for delivery to delivery addresses located within a second predetermined radius from the location of the camp. In some embodiments, the second predetermined radius may be greater than the first predetermined radius. For example, the second predetermined radius may be in a range of 20 miles to 35 miles from the location of the camp. One or more processors 305 may then group the third subset of packages into a second group. One or more processors 305 may repeat these steps while increasing the predetermined radius from the location of the camp each time to generate additional groups.

In other embodiments, one or more processors 305 may generate the plurality of groups by determining a location of a camp storing packages for delivery to customers, identifying a first subset of packages for delivery to delivery addresses located closest to the camp, and grouping the first subset of packages into a first group, with a second subset of packages remaining. In some embodiments, the first subset may comprise a predetermined number of packages. For example, the first subset of packages may comprise a range of 5 to 20 packages. As such, one or more processors 305 may identify packages located closest to the camp until the predetermined number of packages is satisfied. Then, one or more processors 305 may group the first subset of packages into a first group, with a second subset of packages remaining. One or more processors 305 may further identify, from the second subset of packages remaining, a third subset of packages for delivery to delivery addresses located closest to the camp. The second subset may also comprise the same predetermined number of packages. Then, one or more processors 305 may group the third subset of packages into a second group. One or more processors 305 may repeat these steps while maintaining the predetermined number of packages in each group to generate additional groups.

After modifying database 304 to assign the package identifier 402 to a group, method 700 may proceed to block 704. At block 704, one or more processors 305 may generate a map of a plurality of groups, such as map 502 in FIG. 5A. For example, one or more processors 305 may access database 304 to retrieve a list of pending package deliveries and/or redeliveries associated with a camp and generate a map of the pending deliveries, including redeliveries. For example, one or more processors 305 may generate a map and overlay icons, such as activatable icon 504, in one or more locations on the map. Each overlaid icon may be indicative of a pending delivery and/or redelivery. The location, at which each overlaid icon is placed on the map, may be indicative of a delivery address associated with each pending delivery and/or redelivery. One or more processors 305 may continuously update the map to reflect the number of pending deliveries and/or redeliveries in real-time. For example, as the number of package deliveries change, one or more processors 305 may continue updating the map in real-time.

In some embodiments, the map may comprise an activatable icon on a location on the map. For example, one or more processors 305 may place an activatable icon, such as activatable icon 504, on a particular location on the map that represents the location of the delivery address associated with a package represented by the activatable icon. As discussed above, the activatable icon may include a number that is indicative of a number of packages for delivery to the delivery address. Additionally or alternatively, the number may be indicative of a number of deliveries to the delivery address, and each delivery may be associated with one or more packages. In other embodiments, the activatable icon may be color-coded, and the color of the activatable icon may be indicative of the group, to which the activatable icon belongs. In addition, the user may activate the activatable icon on the map to retrieve additional details associated with each corresponding package delivery. For example, as discussed above with reference to FIGS. 5B and 5C, when the user activates the activatable icon on the map, one or more processors 305 may send instructions to one or more processors 306 to display a delivery address associated with each package represented by the activatable icon, a status of delivery for each package, a type of delivery associated with each package, customer-specific delivery instructions, such as access codes associated with the delivery address and notification instructions, redelivery date, a map icon to provide route recommendations, or the like.

After generating the map, method 700 may proceed to block 705. At block 705, one or more processors 305 may, then, send the map, such as map 502, for display on the user device. For example, the user, such as a delivery worker, may open a delivery app, such as delivery app 500, to begin the operation of delivering packages to customers. As such, one or more processors of the user device may send a request for a map of pending package deliveries from one or more processors 305. In response, one or more processors 305 may access database 304 to retrieve the generated map of pending package deliveries and/or redeliveries and send the map for display on the second user device in the camp. Based on the pending package deliveries and/or redeliveries shown on the map, the user of the second user device may being the operation of delivery packages to customers.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for redelivering packages to customers, the system comprising:
    a memory storing instructions; and
    at least one processor configured to execute the instructions to:
        receive, from a first user computing device, a notification of a delivery failure of a package, the notification comprising a package identifier associated with the package and a cause for the delivery failure;
        modify a database to assign the notification of the delivery failure and the cause for the delivery failure to the package identifier;
        modify the database to assign the package identifier to a group, among a plurality of groups, based on a delivery address associated with the package identifier;
        generate a map of the plurality of groups, wherein:
            each of the plurality of groups comprises one or more packages associated with a delivery address within a predetermined distance from each other, and
            the map comprises an activatable icon, wherein a location of the activatable icon on the map is associated with the delivery address associated with the package identifier; and
        send the map for display on a second user computing device, wherein each of the plurality of groups is generated by:
            determining a location of a camp storing packages for delivery to customers;
            identifying a first subset of packages for delivery to delivery addresses located closest to the camp, the first subset comprising a predetermined number of packages;
            grouping the first subset of packages into a first group, with a second subset of packages remaining;
            identifying, from the second subset of packages remaining, a third subset of packages for delivery to delivery addresses located closest to the camp, the third subset comprising the predetermined number of packages; and
            grouping the third subset of packages into a second group,
        wherein the activatable icon includes a number indicative of a number of packages for delivery to the delivery address, and
        wherein the map is used by a user of the second user computing device to redeliver the package associated with the delivery failure.

2. The system of claim 1, wherein the at least one processor is further configured to execute the instructions to send instructions to the first user computing device to return the package to a camp for redelivery.

3. The system of claim 1, wherein:
    the activatable icon is color-coded, and
    a color of the activatable icon is indicative of the group, to which the package identifier associated with the package is assigned.

4. The system of claim 1, wherein the at least one processor is further configured to execute the instructions to send for display on the second user computing device delivery instructions associated with each package when the activatable icon is activated by the user of the second user computing device.

5. The system of claim 1, wherein the at least one processor is further configured to execute the instructions to send instructions to the first user computing device to capture an image of the package, and wherein the notification of the delivery failure further comprises the image of the package.

6. The system of claim 1, wherein the at least one processor is further configured to execute the instructions to:
    determine a redelivery date associated with the package based on at least one of an expected delivery date of the package, the cause for the delivery failure, or a customer redelivery request; and modify the database to assign the redelivery date to the package identifier associated with the package.

7. The system of claim 1, wherein the cause of the delivery failure comprises at least one of a lack of time, an error associated with the delivery address, a misclassification, a shipping delay, an accident, a natural disaster, a customer request to postpone delivery, or a customer absence.

8. A computer-implemented method for redelivering packages to customers, the method comprising:

receiving, from a first user computing device, a notification of a delivery failure of a package, the notification comprising a package identifier associated with the package, a cause for the delivery failure, and a redelivery date;

modifying a database to assign the notification of the delivery failure, the cause for the delivery failure, and the redelivery date to the package identifier;

modifying the database to assign the package identifier to a group, among a plurality of groups, based on a delivery address associated with the package identifier;

generating, by at least one processor, a map of the plurality of groups, wherein:

each of the plurality of groups comprises one or more packages associated with a delivery address within a predetermined distance from each other, and the map comprises an activatable icon, wherein a location of the activatable icon on the map is associated with the delivery address associated with the package identifier; and sending the map for display on a second user computing device, wherein each of the plurality of groups is generated by:

determining a location of a camp storing packages for delivery to customers;

identifying a first subset of packages for delivery to delivery addresses located closest to the camp, the first subset comprising a predetermined number of packages;

grouping the first subset of packages into a first group, with a second subset of packages remaining;

identifying, from the second subset of packages remaining, a third subset of packages for delivery to delivery addresses located closest to the camp, the third subset comprising the predetermined number of packages; and grouping the third subset of packages into a second group, wherein the activatable icon includes a number indicative of a number of packages for delivery to the delivery address, and wherein the map is used by a user of the second user computing device to redeliver the package associated with the delivery failure.

9. The method of claim 8, further comprising sending instructions to the first user computing device to return the package to a camp for redelivery.

10. The method of claim 8, wherein:
the activatable icon is color-coded, and
a color of the activatable icon is indicative of the group, to which the package identifier associated with the package is assigned.

11. The method of claim 8, further comprising sending for display on the second user computing device delivery instructions associated with each package when the activatable icon is activated by the user of the second user computing device.

12. The method of claim 8, further comprising sending instructions to the first user computing device to capture an image of the package, wherein the notification of the delivery failure further comprises the image of the package.

13. The method of claim 8, further comprising:
determining a redelivery date associated with the package based on at least one of an expected delivery date of the package, the cause for the delivery failure, or a customer redelivery request; and modifying the database to assign the redelivery date to the package identifier associated with the package.

14. The method of claim 8, wherein the cause of the delivery failure comprises at least one of a lack of time, an error associated with the delivery address, a misclassification, a shipping delay, an accident, a natural disaster, a customer request to postpone delivery, or a customer absence.

15. A computer-implemented system for redelivering packages to customers, the system comprising:
a memory storing instructions; and
at least one processor configured to execute the instructions to:

receive, from a first user computing device, a notification of a delivery failure of a package,
the notification comprising a package identifier associated with the package and a cause for the delivery failure;

modify a database to assign the notification of the delivery failure and the cause for the delivery failure package identifier;

modify the database to assign the package identifier to a group, among a plurality of groups, based on a delivery address associated with the package identifier;

generate a map of the plurality of groups, wherein:
each of the plurality of groups comprises one or more packages associated with a delivery address within a predetermined distance from each other, and the map comprises an activatable icon, wherein a location of the activatable icon on the map is associated with the delivery address associated with the package identifier; and send the map for display on a second user computing device, wherein the plurality of groups is generated by:

determining a location of a camp storing packages for delivery to customers;

identifying a first subset of packages for delivery to delivery addresses located within a first predetermined radius from the location of the camp;

grouping the first subset of packages into a first group, with a second subset of packages remaining;

identifying, from the second subset of packages remaining, a third subset of packages for delivery to delivery addresses located within a second predetermined radius from the location of the camp, the second predetermined radius being greater than the first predetermined radius; and grouping the third subset of packages into a second group, wherein the activatable icon includes a number indicative of a number of packages for delivery to the delivery address, and wherein the map is used by a user of the second user computing device to redeliver the package associated with the delivery failure.

\* \* \* \* \*

UNITED STATES PATENT AND TRADEMARK OFFICE
CERTIFICATE OF CORRECTION

PATENT NO. : 10,846,646 B1
APPLICATION NO. : 16/550865
DATED : November 24, 2020
INVENTOR(S) : Yulhee Lee et al.

Page 1 of 1

It is certified that error appears in the above-identified patent and that said Letters Patent is hereby corrected as shown below:

In the Claims

Claim 15, Column 32, Line 33, "package identifier" should be read as –to the package identifier–.

Signed and Sealed this
Eleventh Day of February, 2025

Coke Morgan Stewart
*Acting Director of the United States Patent and Trademark Office*